United States Patent
Yu et al.

(10) Patent No.: US 8,964,144 B2
(45) Date of Patent: Feb. 24, 2015

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Shenzhen (CN); Jiaqiang Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/695,437

(22) PCT Filed: Oct. 26, 2012

(86) PCT No.: PCT/CN2012/083595
§ 371 (c)(1),
(2) Date: Oct. 31, 2012

(87) PCT Pub. No.: WO2014/063356
PCT Pub. Date: May 1, 2014

(65) Prior Publication Data
US 2014/0111739 A1    Apr. 24, 2014

(30) Foreign Application Priority Data

Oct. 24, 2012 (CN) .......................... 2012 1 0410004

(51) Int. Cl.
*G02F 1/1335*  (2006.01)
*F16M 1/00*    (2006.01)
*H04N 5/64*    (2006.01)

(52) U.S. Cl.
CPC ........... *G02F 1/133608* (2013.01); *F16M 1/00* (2013.01); *G02F 1/1335* (2013.01); *H04N 5/64* (2013.01)
USPC ........................................................... 349/58

(58) Field of Classification Search
CPC ........ G02F 2001/133314; G02F 2001/133317; G02F 2001/13332; G02F 2001/133311
USPC ........................................................ 349/58
See application file for complete search history.

(56) References Cited

U.S. PATENT DOCUMENTS

| | | | | |
|---|---|---|---|---|
| 7,126,651 B2 * | 10/2006 | Kim et al. | ........................ | 349/58 |
| 8,559,192 B2 * | 10/2013 | Murakata et al. | ............. | 361/816 |
| 8,724,049 B2 * | 5/2014 | Jeong | ............................... | 349/60 |
| 2008/0111938 A1 * | 5/2008 | Park et al. | ........................ | 349/58 |

* cited by examiner

*Primary Examiner* — James Dudek
(74) *Attorney, Agent, or Firm* — Andrew C. Cheng

(57) ABSTRACT

A backlight module and a liquid crystal display device are disclosed, and the backlight module which comprises a backboard defining a first sidewall with as first engaging device formed thereon. A plastic frame includes a second sidewall with a second engaging device. An elastic member arranged between the first sidewall of the backboard, and a second sidewall or the plastic frame; and wherein the first engaging device interengages with the second engaging device, and the elastic member deformed when the first and second engaging devices interlocked. By this arrangement, the interengagement between the plastic frame and the backboard become more durable and reliable.

10 Claims, 3 Drawing Sheets

BACKLIGHT MODULE AND LIQUID CRYSTAL DISPLAY DEVICE

FIELD OF THE INVENTION

The present invention relates to a technical filed of liquid display, and more particularly, to a backlight module and a liquid crystal display device incorporated with such a backlight module.

BACKGROUND OF THE INVENTION

Currently, a prior art backlight module generally includes a backboard, a plastic frame and an optical film. The optical film is disposed within a receiving space located within the backboard. The plastic frame is defined with a retaining hole to engage with a hook so as to attach the plastic frame onto the backboard. The plastic film will press upon the optical film so as to securely position the optical film within the receiving space.

While the dimension of the display panel becomes larger and larger, the dimension of the backboard, the plastic frame, and the optical film become larger and larger. In comparison, the longer the plastic frame, the more the retaining holes are required. During the assembling, transportation, and utilization of the backlight module, different portion of the plastic frame may also withhold different stress. There is a very high possibility of separation between the retaining holes of the plastic frame and the hook of the backboard. Once a separation between the plastic frame and the backboard is encountered, the optical film will become loose, and a leakage of the light from the backlight module will also be encountered.

SUMMARY OF THE INVENTION

It is an objective of the present invention to provide a technical solution to the prior art by providing an improved backlight module such that the interengagement between the plastic frame and the backboard is more reliable and durable. It is also the object of the present invention to provide a liquid crystal display device incorporated with such a backlight module.

In order to resolve the issue encountered by the prior art, the present invention provides a technical solution by introducing a backlight module which comprises a backboard including a first sidewall with a first hook and a third hook. A plastic frame includes a second sidewall and a third sidewall, a slot and an elastic member. Wherein the second sidewall and the third sidewall are arranged on the same side, and the third sidewall and the second sidewall are arranged in parallel with the slot defined therebetween, wherein the second sidewall is defined with a second retaining hole, and a fourth retaining hole. Wherein a bottom of the slot located between the second retaining hole and the fourth retaining hole is embossed toward the backboard so as to form the elastic member; and wherein the first hook engages with the second retaining opening, and the third hook engages with the fourth retaining opening, wherein the first sidewall is received into the slot defined between the second and third sidewalls, and the elastic member abuts against the first sidewall of the backboard such that the elastic member is deformed.

Wherein the elastic member has circular configuration.

In order to resolve the issue encountered by the prior art, the present invention provides a technical solution by introducing a backlight module which comprises a backboard defining a first sidewall with a first engaging device formed thereon. A plastic frame includes a second sidewall with a second engaging device. An elastic member arranged between the first sidewall of the backboard, and a second sidewall of the plastic frame; and wherein the first engaging device interengages with the second engaging device, and the elastic member deformed when the first and second engaging devices interlocked.

Wherein the first sidewall further includes a third engaging device, the second sidewall is arranged with a fourth engaging device, wherein the fourth engaging device interlocks with the third engaging device, and the elastic member is arranged between the fourth and second engaging devices.

Wherein the plastic frame includes a third sidewall located on the same side of the second sidewall, and the third sidewall is arranged in parallel with the second sidewall so as to define a slot therebetween; wherein a bottom of the slot located between the second engaging device and the fourth engaging device is embossed toward the backboard so as to form the elastic member; and wherein the first sidewall is received into the slot defined between the second and third sidewalls, and the elastic member abuts against the first sidewall of the backboard such that the elastic member is deformed.

Wherein the elastic member has circular configuration.

Wherein the first engaging device is a hook, and the second engaging device is a retaining hole; or alternatively, the first engaging device is a retaining hole, and the second engaging device is a hook.

Wherein the third engaging device is a hook, and the fourth engaging device is a retaining hole; or alternatively, the third engaging device is a retaining hole, and the fourth engaging device is a hook.

In order to resolve the issue encountered by the prior art, the present invention provides a technical solution by introducing a liquid crystal display device configured with a backlight module and a display panel, and the backlight module comprises a backboard defining a first sidewall with a first engaging device formed thereon. A plastic frame includes to second sidewall with a second engaging device. An elastic member arranged between the first sidewall of the backboard, and a second sidewall of the plastic frame. Wherein the first engaging device interengages with the second engaging device, and the elastic member deformed when the first and second engaging devices interlocked and wherein the display panel is arranged onto the plastic frame.

Wherein the first sidewall further includes a third engaging device, the second sidewall is arranged with a fourth engaging device, wherein the fourth engaging device interlocks with the third engaging device, and the elastic member is arranged between the fourth and second engaging devices.

Wherein the plastic frame includes a third sidewall located on the same side of the second sidewall, and the third sidewall is arranged in parallel with the second sidewall so as to define a slot therebetween; wherein a bottom of the slot located between the second engaging device and the fourth engaging device is embossed toward the backboard so as to form the elastic member; and wherein the first sidewall is received into the slot defined between the second and third sidewalls, and the elastic member abuts against the first sidewall of the backboard such that the elastic member is deformed.

Wherein the elastic member has circular configuration.

Wherein the first engaging device is a hook, and the second engaging device is a retaining hole; or alternatively, the first engaging device is a retaining hole, and the second engaging device is a hook.

Wherein the third engaging device is a hook, and the fourth engaging device is a retaining hole; or alternatively, the third engaging device is a retaining hole, and the fourth engaging device is a hook.

The present invention can be concluded with the following advantages. As compared to the existing prior art, the elastic member is arranged between the plastic frame and the backboard of the backlight module. As a result, when the plastic frame is attached to the backboard, the elastic member will be compressed to deform by both the plastic frame and the backboard. Once the elastic member is deformed, it creates a bouncing force pushing the plastic frame and the backboard to move away from each other, i.e. the plastic frame is exerted with a force facing away from the backboard, and the backboard is exerted with a force facing away from the plastic fame. In addition, the second engaging device is arranged on the plastic frame, and the first engaging device is arranged on the backboard. According, with the functioning of reacting force from the deformed elastic member, the first engaging device is exerted with a force pushing it away form the second engaging device, and the second engaging device is exerted with a force pushing it away from the first engaging device. By this arrangement, the interengagement between the first and second engaging devices become more durable and reliable. In turn, the plastic frame is securely attached to the backboard.

DETAILED DESCRIPTION OF PREFERRED EMBODIMENT

Detailed description will be given in view of various embodiment along with the drawings.

Figure 1:
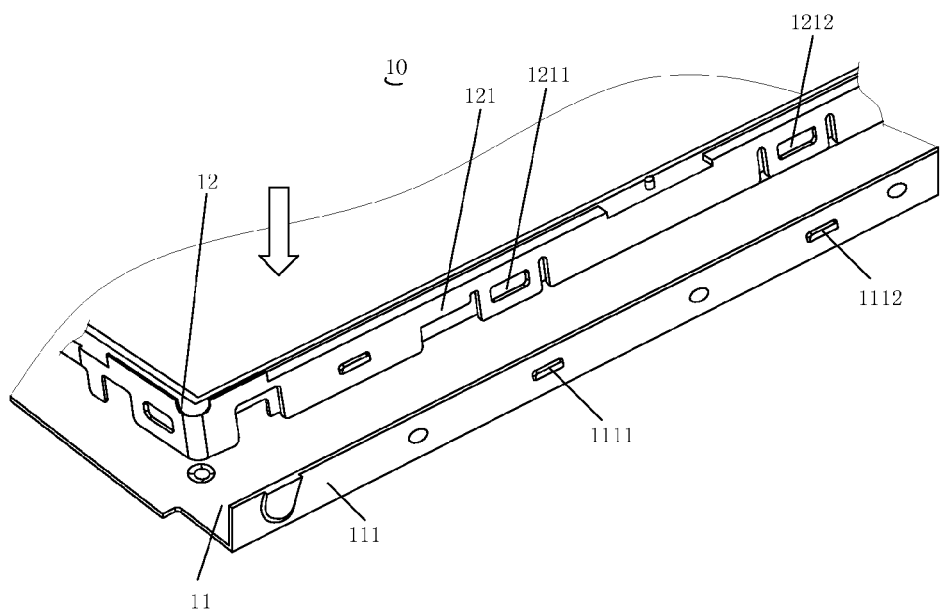
FIG. 1 is an illustrational and perspective view of an interengagement between a plastic frame and a backboard of a backlight module made according to the present invention.
Figure 2:
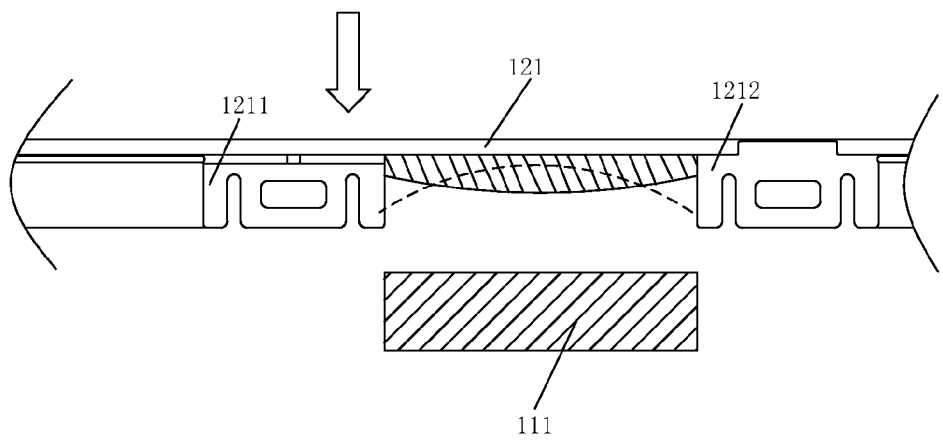
FIG. 2 is a plan view of an interengagement of the plastic frame and the backboard of the backlight module made accordance with the present invention.
Figure 3:
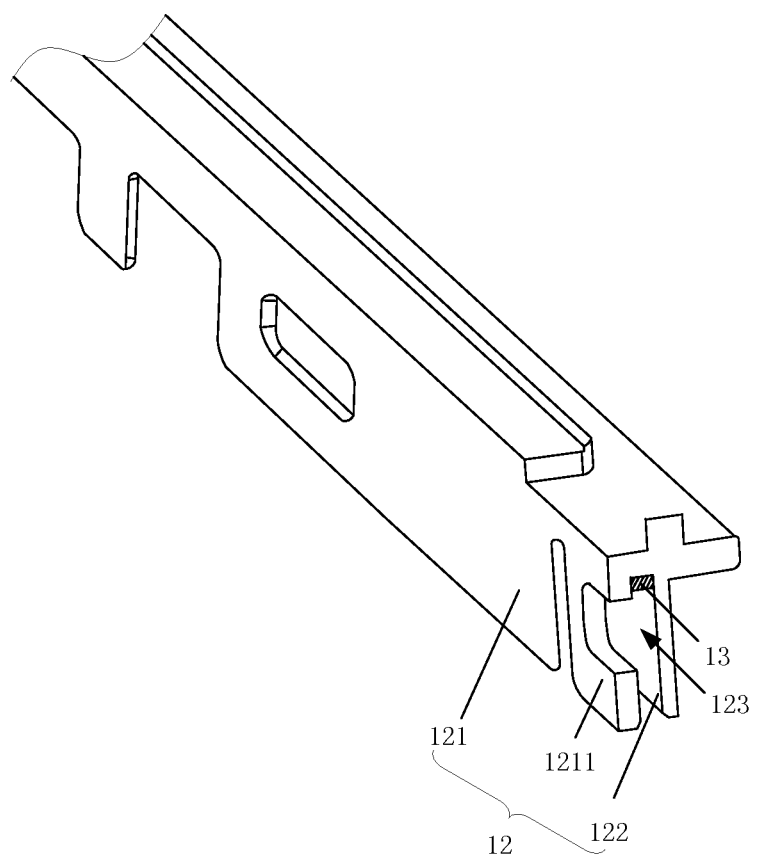
FIG. 3 is a cross sectional view of a plastic frame of a backlight module in accordance with the present invention.

Referring to FIGS. 1, 2 and 3. FIG. 1 is an illustrational and perspective view of an interengagement between a plastic frame and a backboard of a backlight module made according to the present invention. FIG. 3 is a cross sectional view of a plastic frame of a backlight module in accordance with the present invention. As shown, the backlight module 10 includes a backboard 11, a plastic frame 12, and an elastic member 13.

The backboard 11 includes a first sidewall 111 on which a first engaging device 1111 is arranged. The plastic frame 12 includes a second sidewall 121 on which a second engaging device 1211 is arranged. Interengagement between the first engaging device 1111 and the second engaging device 1211 will make the plastic frame 12 be securely attached to the backboard 11.

In the current embodiment, the elastic member 13 is arranged between the first sidewall 111 and the second sidewall 121. The elastic member 13 can be integrally formed with the plastic frame 12 and embodied as an embossment from the second sidewall 121 of the plastic frame 12 facing away the backboard 11. The elastic member 13 can be made from the same material as the second sidewall 121. When the plastic frame 12 is attached to the backboard 11, the elastic member 13 will be deformed as depressed by the first sidewall 111 of the backboard 11. Since the elastic member 13 is integrally formed with the plastic frame 12, accordingly, the deformation referred thereto includes both the deformations of the elastic member 13 and the second sidewall 121. Of course, in other embodiment of the present invention, the elastic member 13 can also be made from material other than the material of the plastic frame 12. For example, the plastic frame 12 can be made with deformable material in most of its portion other than the portion of the elastic member 13, i.e. the elastic member 13 and the backboard 11 are both made from comparably hard material. Accordingly, when the plastic frame 12 is attached to the backboard 11, the elastic member 13 will rigidly abut against the backboard 11 such that the plastic frame 12 will bow up to deform. Alternatively, the plastic frame 12 along with the elastic member 13 can be made from comparably harder material, while the backboard 11 is made from soft and deformable material. Accordingly, when the plastic frame 12 is attached to the backboard 11, the backboard 11 will be bowed up to deform as being pressed against by the elastic member 13.

When the elastic member 13 is squeezed to deform, correspondingly, the elastic member 13 will react to create a bouncing force which exerts onto the backboard 11 and the plastic frame 12. As a result, the backboard 11 is exerted with a force moving away from the plastic frame 12, while the plastic frame 12 is exerted with a force facing away from the backboard 11. The first engaging device 1111 and the backboard 11 are integrally formed, and the second engaging device 1211 and the second sidewall 12 are integrally formed, i.e. the first engaging device 1111 is exerted with a force facing away the second engaging device 1211, and the second engaging device 1211 is exerted with a force facing away from the first engaging device 1111. Accordingly, the interengagement between the first and second engaging devices 1111 and 1211 are more durable and reliable. As a result, it creates a robust interengagement between the backboard 11 and the plastic frame 12.

It should be noted that in other embodiments, the elastic member 13 is not necessity required to be integrally formed with the plastic frame 12. The elastic member 13 can be integrally formed with the backboard 11 as well. Or alternatively, the elastic member 13 could be formed as a single piece, such as a spring member with one end anchored to the backboard 11 or the plastic frame 12. Accordingly, when the plastic frame 12 is attached to the backboard 11, the elastic member 13 is deformed by the squeeze of the backboard 11 and the plastic frame 12.

Furthermore, the backboard 11 further includes a third engaging device 1112. The third engaging device 1112 and the second engaging device 1111 are disposed on external surface of the first sidewall 111 of the backboard 11. The plastic frame 12 further includes a third sidewall 122 and a slot 123. The third sidewall 122 and the second sidewall 121 are located at the same side, and the third sidewall 122 and the second sidewall 121 are arranged in parallel to each other. The slot 123 is defined between the third sidewall 122 and the second sidewall 121. The second sidewall 121 has a fourth engaging device 1212. The elastic member 13 is an embossment located on a bottom of the slot 123 in a position between the second engaging device 1211 and the fourth engaging device 1212. In addition, the elastic member 3 is facing away from the backboard 11. When the first engaging device 1111 and the third engaging device 1112 engage with the second engaging device 1211 and the fourth engaging device 1212, the first sidewall 111 of the backboard 11 engages with the slot 123 of the plastic frame 12, and further abuts against to the elastic member 13 of the plastic frame 12. The elastic member 13 will be deformed under pressure.

In the current embodiment, the portion of the plastic frame 12 in which the elastic member 13 is formed can be preferably a circular shape. Of course, other shape can also be adopted, such as a columnar shape, a truncated shape, etc. The first engaging device 1111 is preferably a hook, and the second engaging device 1211 is preferably a retaining hole. Alternatively, the first engaging device 1111 is preferably a retaining hole, and the second engaging device 1211 is preferably a hook. The third engaging device 1112 is preferably a hook, and the fourth engaging device 1212 is preferably a retaining hole. Alternatively, the third engaging device 1112 is preferably a retaining hole, and the fourth engaging device 1212 is preferably a hook.

Figure 4:
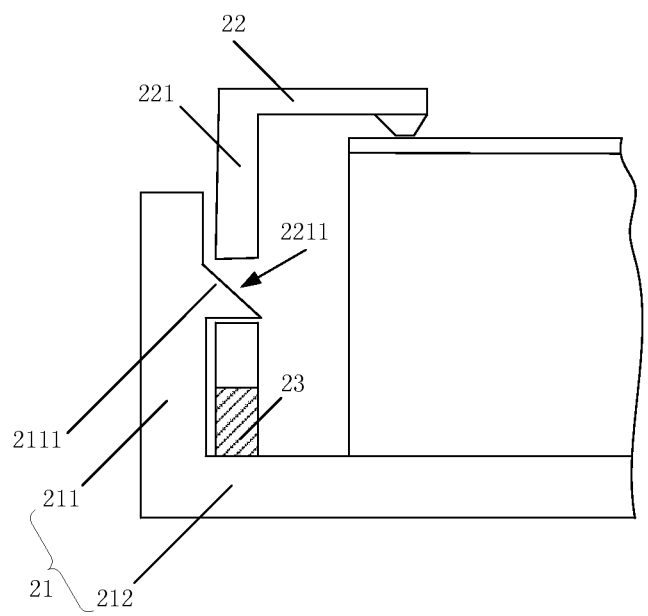
FIG. 4 is a plan view of an interengagement between a plastic frame and a backboard of a backlight module in accordance with a second embodiment of the present invention.

Referring to FIG. 4, the difference between the current embodiment and other embodiments is the backboard 21 further includes a bottom board 212. The bottom board 212 is attached to the bottom of the first sidewall 211 of the backboard 21. The first engaging device 2111 and the third engaging device (not shown) are arranged on external side of the first sidewall 211. The elastic member 23 is an extension of the second sidewall 221 of the plastic frame 22, facing away the backboard 21 and located between the second engaging device 2211 and the fourth engaging device (not shown). The first engaging device 2111 and the third engaging device interlock with the second engaging device 2211 and the fourth engaging device, respectively. When the plastic frame 22 is attached to the backboard 21, the elastic member 23 abuts against to the bottom board 212 of the backboard 21, and deforms accordingly under pressure.

In the current embodiment, the elastic member 13 is arranged between the plastic frame 12 and the backboard 11 of the backlight module 10. When the plastic frame 12 and the backboard 11 are assembled together, the plastic frame 12 and the backboard 11 will jointly depress the elastic member 13 which consequently experiences a deformation. After the elastic member 13 is deformed, it creates bouncing force exerting to both the plastic frame 12 and the backboard 11 such that both of the plastic frame 12 and the backboard 11 experience a force pushing the two away from each other. The second engaging device 1211 is integrally formed with the plastic frame 12, and the first engaging device 1111 is integrally formed with the backboard 11. Similarly, the first engaging device 1111 is exerted a force pushing away from the second engaging device 1211, and the second engaging device 1211 experiences a force pushing it away from the first engaging device 1111. By this arrangement, the interengagement between the first engaging device 1111 and the second engaging device 1211 becomes more reliable and durable. The risk of separating or losing between the first and second engaging devices 1111 and 1211 is low, and the interengagement between the backboard 11 and the plastic frame 12 is more reliable and durable.

Figure 5:
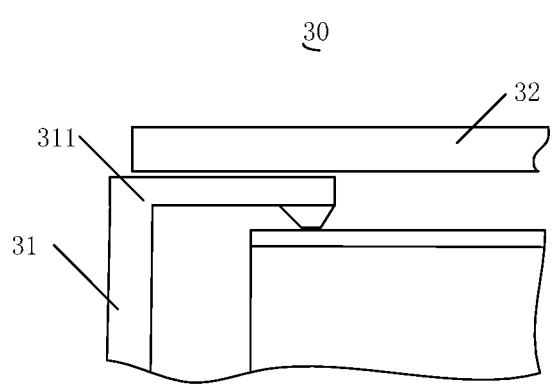
FIG. 5 is a partial and plan view of a liquid crystal display device made in accordance with the present invention.

The implementation of the backlight module 10 can be incorporated into a liquid crystal display device. Referring to FIG. 5 which is a partial and plan view of a liquid crystal display device made in accordance with the present invention. The liquid crystal display device 30 includes a backlight module 31 and a display panel 32. The backlight module 31 can be any one of the backlight modules illustrated in the above embodiments. The display panel 32 is disposed onto the plastic frame 311 of the backlight module 31.

The above described is merely a primary disclosure. In order to readily clarify the technical solution, and therefore implement that technical solution in view of the specification, a detailed description in view of a preferable embodiment in conjunction with accompanied drawings will be given herebelow. By this, other purposes, features and characteristics can be readily appreciated through the detailed description.

The invention claimed is:

1. A backlight module, comprising
   a backboard including a first sidewall with a first hook and a third hook;
   a plastic frame including a second sidewall and a third sidewall, a slot and an elastic member;
   wherein the second sidewall and the third sidewall are arranged on the same side, and the third sidewall and the second sidewall are arranged in parallel with the slot defined therebetween, wherein the second sidewall is defined with a second retaining hole, and a fourth retaining hole;
   wherein a bottom of the slot located between the second retaining hole and the fourth retaining hole is embossed toward the backboard so as to form the elastic member; and
   wherein the first hook engages with the second retaining opening, and the third hook engages with the fourth retaining opening, wherein the first sidewall is received into the slot defined between the second and third sidewalls, and the elastic member abuts against the first sidewall of the backboard such that the elastic member is deformed.

2. The backlight module as recited in claim 1, wherein the elastic member has circular configuration.

3. A backlight module, comprising:
   a backboard defining a first sidewall with a first engaging device formed thereon;
   a plastic frame including a second sidewall with a second engaging device;
   an elastic member arranged between the first sidewall of the backboard, and a second sidewall of the plastic frame; and
   wherein the first engaging device interengages with the second engaging device, and the elastic member deformed when the first and second engaging devices interlocked;
   wherein the first sidewall further includes a third engaging device, the second sidewall is arranged with a fourth engaging device, wherein the fourth engaging device interlocks with the third engaging device, and the elastic member is arranged between the fourth and second engaging devices; and
   wherein the plastic frame includes a third sidewall located on the same side of the second sidewall, and the third sidewall is arranged in parallel with the second sidewall so as to define a slot therebetween; wherein a bottom of the slot located between the second engaging device and the fourth engaging device is embossed toward the backboard so as to form the elastic member; and wherein the first sidewall is received into the slot defined between the second and third sidewalls, and the elastic member abuts against the first sidewall of the backboard such that the elastic member is deformed.

4. The backlight module as recited in claim 3, wherein the elastic member has circular configuration.

5. The backlight module as recited in claim 3, wherein the first engaging device is a hook, and the second engaging device is a retaining hole; or alternatively, the first engaging device is a retaining hole, and the second engaging device is a hook.

6. The backlight module as recited in claim 3, wherein the third engaging device is a hook, and the fourth engaging device is a retaining hole; or alternatively, the third engaging device is a retaining hole, and the fourth engaging device is a hook.

7. A liquid crystal display device configured with a backlight module and a display panel, comprising:
   a backboard defining a first sidewall with a first engaging device formed thereon;
   a plastic frame including a second sidewall with a second engaging device;
   an elastic member arranged between the first sidewall of the backboard, and a second sidewall of the plastic frame;
   wherein the first engaging device interengages with the second engaging device, and the elastic member deformed when the first and second engaging devices interlocked; and
   wherein the display panel is arranged onto the plastic frame;
   wherein the first sidewall further includes a third engaging device, the second sidewall is arranged with a fourth engaging device, wherein the fourth engaging device interlocks with the third engaging device, and the elastic member is arranged between the fourth and second engaging devices; and
   wherein the plastic frame includes a third sidewall located on the same side of the second sidewall, and the third sidewall is arranged in parallel with the second sidewall so as to define a slot therebetween; wherein a bottom of the slot located between the second engaging device and the fourth engaging device is embossed toward the backboard so as to form the elastic member; and wherein the first sidewall is received into the slot defined between the second and third sidewalls, and the elastic member abuts against the first sidewall of the backboard such that the elastic member is deformed.

8. The liquid crystal display device as recited in claim 7, wherein the first engaging device is a hook, and the second engaging device is a retaining hole; or alternatively, the first engaging device is a retaining hole, and the second engaging device is a hook.

9. The liquid crystal display device as recited in claim 7, wherein the third engaging device is a hook, and the fourth engaging device is a retaining hole; or alternatively, the third engaging device is a retaining hole, and the fourth engaging device is a hook.

10. The liquid crystal display device as recited in claim 7, wherein the elastic member has circular configuration.

\* \* \* \* \*